US011802610B2

(12) United States Patent
Shin et al.

(10) Patent No.: US 11,802,610 B2
(45) Date of Patent: Oct. 31, 2023

(54) CONTINUOUSLY VARIABLE TRANSMISSION

(71) Applicants: ESTBIKE CO., LTD., Gunpo-si, Gyeonggi-do (KR); Young Chul Shin, Gunpo-si (KR); In Kyung Kang, Gunpo-si (KR)

(72) Inventors: Young Chul Shin, Gunpo-si (KR); In Kyung Kang, Gunpo-si (KR)

(73) Assignees: ESTBIKE CO., LTD., Gunpo-si (KR); Young Chul Shin, Gunpo-si (KR); In Kyung Kang, Gunpo-si (KR)

( * ) Notice: Subject to any disclaimer, the term of this patent is extended or adjusted under 35 U.S.C. 154(b) by 616 days.

(21) Appl. No.: 15/545,300

(22) PCT Filed: Dec. 7, 2016

(86) PCT No.: PCT/KR2016/014286
§ 371 (c)(1),
(2) Date: Jul. 20, 2017

(87) PCT Pub. No.: WO2018/097383
PCT Pub. Date: May 31, 2018

(65) Prior Publication Data
US 2018/0291985 A1    Oct. 11, 2018

(30) Foreign Application Priority Data

Nov. 23, 2016  (KR) .......................... 10-2016-0156626

(51) Int. Cl.
*F16H 3/56* (2006.01)
*F16H 29/04* (2006.01)

(52) U.S. Cl.
CPC .............. *F16H 3/56* (2013.01); *F16H 29/04* (2013.01); *F16H 2200/2007* (2013.01); *F16H 2200/2035* (2013.01)

(58) Field of Classification Search
CPC . F16H 3/56; F16H 29/04; F16H 29/18; F16H 2200/2007; F16H 2200/2035
See application file for complete search history.

(56) References Cited

U.S. PATENT DOCUMENTS 4,909,101 A * 3/1990 Terry, Sr. ................. B62M 9/08
475/16
6,537,168 B1 * 3/2003 Han ........................ F16H 29/04
475/8

(Continued)

FOREIGN PATENT DOCUMENTS

JP      2013142428 A    7/2013
JP      5796499 B2     10/2015

(Continued)

*Primary Examiner* — Huan Le
(74) *Attorney, Agent, or Firm* — Maschoff Brennan

(57) ABSTRACT

Disclosed are a continuously variable transmission including a plurality of input links integrated into one input link, a plurality of coupler links integrated into one coupler disk, and at least four even-numbered output gears circumscribed about at least four even-numbered output links via a clutch, wherein, even if two output gears of the at least four even-numbered output gears are put into a slip state by the clutch, the other two output gears rotate in a direction of forcibly transmitting power.

16 Claims, 10 Drawing Sheets

(56) References Cited

U.S. PATENT DOCUMENTS

| | | | |
|---|---|---|---|
| 2004/0003672 A1* | 1/2004 | Rubenstein | F16H 29/04 |
| | | | 74/125 |
| 2009/0197731 A1 | 8/2009 | Kobler | |
| 2011/0253496 A1 | 10/2011 | Shin et al. | |
| 2012/0178577 A1* | 7/2012 | Nishimura | B60K 6/48 |
| | | | 475/170 |

FOREIGN PATENT DOCUMENTS

| | | |
|---|---|---|
| KR | 10-0858910 B1 | 9/2008 |
| KR | 10-2010-0034066 A | 4/2010 |
| KR | 10-0984187 B1 | 9/2010 |
| KR | 10-1101366 B1 | 1/2012 |
| KR | 10-1254596 B1 | 4/2013 |
| KR | 10-1354154 B1 | 1/2014 |
| KR | 10-1389280 B1 | 4/2014 |

\* cited by examiner

CONTINUOUSLY VARIABLE TRANSMISSION

TECHNICAL FIELD

The present invention relates to a lever crank mechanism type continuously variable transmission having an input link, an output link and a coupler link coupled to and interposed therebetween, and more particularly, to a continuously variable transmission in which a plurality of input links is integrated, a plurality of coupler links is integrated, and a plurality of output gears circumscribed about a plurality of output links, which performs wiper movement, via a one-way clutch is gear-engaged with each other.

BACKGROUND ART

Generally, speed reducers are classified into a constant speed reducer, which outputs power at a constant reduction ratio by combining gears of different sizes, and a continuously variable transmission, which can vary the reduction ratio by applying a conical reduction device.

Rotational power generated from a power generator such as a motor or an engine is output at high rotational speed but with weak force (torque). Therefore, most industrial machines employ reduction devices to increase torque.

Here, the speed reducer increases torque while decreasing the speed of rotation transmitted from the power generator. However, if the load applied to the output shaft is greater than the output torque of the output shaft, the load may reversely operate on the motor or the engine, shortening the service life of the motor or the engine, although the speed reducer outputs increased torque with reduced rotational speed.

Further, when a load greater than the output torque of the output shaft operates on the motor or the engine in a reverse direction, a target output cannot be supplied to the output shaft.

A continuously variable transmission for solving the problems above is disclosed in Korean Patent Application No. 10-2007-0064349 filed by the inventors of the present invention.

The continuously variable transmission disclosed in the above patent application has a lever crank mechanism provided between an input shaft rotated in one direction by an external force (such as a motor or an engine) and an output shaft configured to receive the driving force of the input shaft and transmit the driving force to the outside.

This lever crank mechanism is a known mechanism that turns one-way rotational movement of the input shaft into reciprocating pivotal movement of the output shaft within a certain angular range. A device using this known mechanism may correspond to, for example, a windshield wiper drive device.

However, for the conventional continuously variable transmission using the lever crank mechanism, the power transmission system is biased to one side, which causes vibration and noise during operation.

A continuously variable transmission capable of solving this problem is disclosed in Korean Patent Application No. 10-2008-0092992 filed by the inventors of the present invention.

As shown in FIGS. 1 and 2, the continuously variable transmission disclosed in the above document includes an input shaft 1 rotatably mounted on a frame (not shown) and receiving a rotational force input from the outside; a pair of driven shafts 2 and 2' arranged parallel to the input shaft 1 with the input shaft 1 interposed therebetween and receiving power from the input shaft 1 while being rotatably mounted on the frame; a pair of variable input links 3 and 4 coupled to the input shaft 1 so as to be rotated by transmitted rotational force and accommodating, together with a pair of variable pins P1 and P2 whose radius of rotation is variable according to external load, a pair of reaction force devices 3a and 4a elastically pressing the pair of variable pins P1 and P2 radially outward; two pairs of output links 7, 8; 7', 8' each having one circumscribed and coupled end with one-way clutch bearings 5, 6; 5', 6' interposed therebetween, the one-way clutch bearings 5, 6; 5', 6' receiving bidirectional rotational force transmitted to each of the pair of driven shafts 2 and 2' and rotating each of the pair of driven shafts 2 and 2' in one direction; and two pairs of coupler links 9, 10; 9', 10' each having one end rotatably coupled to each of the pair of variable pins P1 and P2 and the other end rotatably coupled to each of the two pairs of output links 7, 8; 7', 8'.

The variable pins P1 and P2 may be arranged with a phase difference of 180 degrees with respect to each other. The output links 7 and 7' of the two pairs of output links may be arranged such that one output link 7 precedes the other output link 7' by a phase difference greater than 0 degrees and less than 180 degrees in the rotational direction, and the other output links 8 and 8' may also be arranged such that one output link 8 precedes the other output link 8' by a phase difference greater than 0 degrees and less than 180 degrees in the rotational direction.

The two pairs of output links 7, 8; 7', 8' may be coupled to the pair of driven shafts 2 and 2' for driving in the following manner. As shown in FIGS. 1 and 2, one end of each of the output links 7, 8, 7' and 8' may be fixedly circumscribed about the pair of driven shafts 2 and 2' with one-way clutch bearings 5, 6; 5', 6' interposed therebetween. In addition, a pair of output gears G3 and G3' is fixedly circumscribed about (about?) the pair of driven shafts 2 and 2', and a final output gear G4 to be engaged with the pair of output gears G3 and G3' is disposed between the output gears G3 and G3'.

A final output shaft 15 to be coupled with a driven shaft (not shown) of an external device to which power is to be transmitted is fixedly inscribed in the final output gear G4. For the conventional continuously variable transmission configured as described above, since the coupler links, the output links and the driven shafts are disposed symmetrically with respect to the variable input link, vibration is not generated during operation and lower noise is generated than unconventional cases. Further, since a pair of output gears which are fixedly circumscribed about the two driven shafts is engaged with each other with the final output gear interposed therebetween, the pair of output gears can cooperate with each other to rotate the final output gear in one direction such that the output gears can be rotated with a large force. Thereby, an external device can be driven with a large force.

However, this continuously variable transmission includes a first link unit 3, 9, 9', 7, 7' and a second link unit 4, 10, 10', 8', which are spaced apart from each other by a predetermined distance in the longitudinal direction of the input shaft 1, and perform linkage movement with a phase difference of 180 degrees therebetween. Accordingly, the continuously variable transmission is large. Further, the first and second link units rotate with the phase difference of 180 degrees therebetween, namely rotate in the opposite directions with the one-way clutch interposed between the first link unit and the driven shaft and between the second link unit and the driven shaft, such that the first and second link units alternately transmit power of the input shaft 1 to the driven shafts. However, since the first and second link units transmit power during the forward movement and do not transmit power during the reverse movement, the power for power transmission is weak.

In order to solve these problems, as disclosed in Korean Patent No. 10-1354154 filed by and granted to the inventors of the present invention, third and fourth link units in addition to the first and second link units may be employed such that the link units have a phase difference of 90 degrees therebetween. However, this solution only increases the number of components of the continuously variable transmission.

For a conventional continuously variable transmission having four output links having a phase difference of 90 degrees therebetween, since driving force is transmitted to the output gears only by the wiper movement of the output links in one direction with only four one-way clutches interposed between the four output links and four output gears, power transmission can be interrupted. Further, since the four output gears are not engaged with each other, they are weak in terms of balance. Additionally, since the load transmitted from the input side and the output side is concentrated at the two one-way clutches and the two output gears, a problem in durability may be raised.

DISCLOSURE

Technical Problem

Therefore, the present invention has been made in view of the above problems.

Technical Solution

In accordance with one aspect of the present invention, provided is a continuously variable transmission including a plurality of input links integrated into one input link, a plurality of coupler links integrated into one coupler disk, and at least four even-numbered output gears circumscribed about at least four even-numbered output links via a clutch, wherein, even if two output gears of the at least four even-numbered output gears are put into a slip state by the clutch, the other two output gears rotate in a direction of forcibly transmitting power.

Advantageous Effects

According to the present invention, a plurality of coupler links, which are conventionally separated from each other, is provided as a single coupler disk. Thereby, the number of components is reduced and tolerance management is easier than in the conventional cases. Accordingly, a lever-crank mechanism type continuously variable transmission whose manufacturing costs and maintenance costs are remarkably reduced compared to the conventional cases may be provided.

In addition, according to the present invention, at least two output gears among at least four even-numbered output gears circumscribed about at least four even-numbered output links for wiper movement via a clutch rotate to transmit received power by assistance from the at least two remaining output gears. Accordingly, interruption of power transmission can be prevented, and power twice as much as the power that can be transmitted in the conventional cases can be transmitted to the output shaft. Further, since the at least four even-numbered output gears are engaged with each other, a lever-crank mechanism type continuously variable transmission having gears balanced with each other and thus exhibiting structurally improved durability may be provided.

BEST MODE

The present invention includes: a housing provided in the case so as to be rotatable about an output shaft and to be rotatably circumscribed about the output shaft, and having an input driven gear fixedly circumscribed thereabout and engaged with an input drive gear fixedly circumscribed about the input shaft, the housing receiving power from the input shaft and rotating about the output shaft to serve as an input link of a lever crank mechanism; a variable pin positioned at a rotation center of the output shaft on one side of the housing and mounted to be movable in a radial direction of the output shaft; a coupler disk circumscribed about the variable pin so as to be movable in a radial direction of the output shaft together with the variable pin to operate as a coupler link when the variable pin is biased from the rotation center of the output shaft; at least four even-numbered pivot shafts inscribed in each of at least four even-numbered output gears of a first group with a clutch interposed therebetween, the at least four pivot shafts being engaged with a final output gear fixedly circumscribed about the output shaft and spaced by the same phase difference from each other around the final output gear; at least four even-numbered eccentric shafts protruding toward the variable pin from one end of each of the pivot shafts facing the variable pin and coupled to the pivot shafts such that the at least four pivot shafts operate as output links and the at least four even-numbered eccentric shafts are deviated from rotation centers of the pivot shafts 60, the at least four eccentric shafts being arranged around the output shaft with the same phase difference therebetween when the variable pin is positioned at the rotation center of the output shaft; and a track ring integrally provided to the coupler disk to guide the at least four even-numbered eccentric shafts such that the at least four even-numbered eccentric shafts can pivot about rotation centers of the pivot shafts and revolve around the rotation center of the output shaft.

MODE FOR INVENTION

Hereinafter, a continuously variable transmission according to an embodiment of the present invention will be described in detail with reference to FIGS. 3 to 7.

Figure 3:
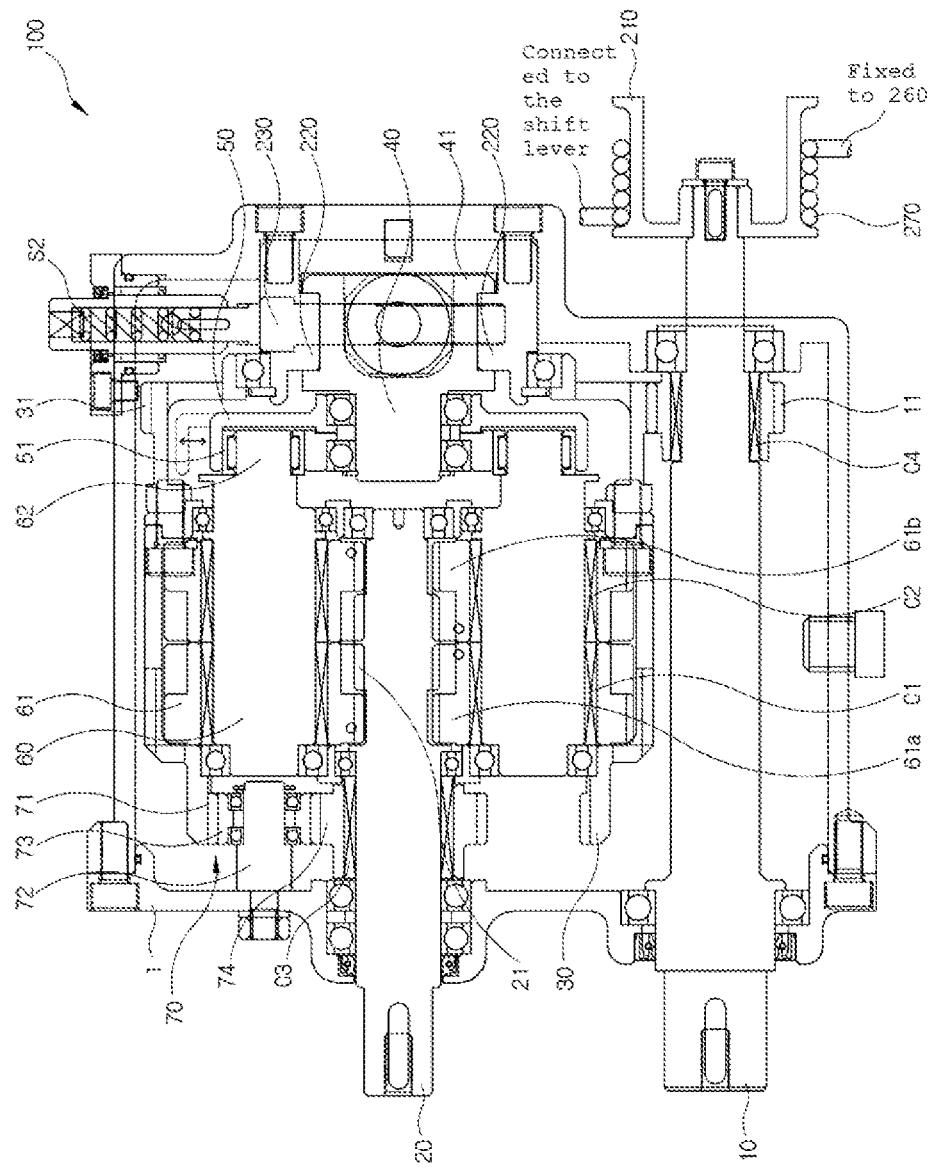
FIG. 3 is a cross-sectional view illustrating a continuously variable transmission according to an embodiment of the present invention.

In FIG. 3, the continuously variable transmission of this embodiment is indicated by reference numeral 100.

Figure 1:
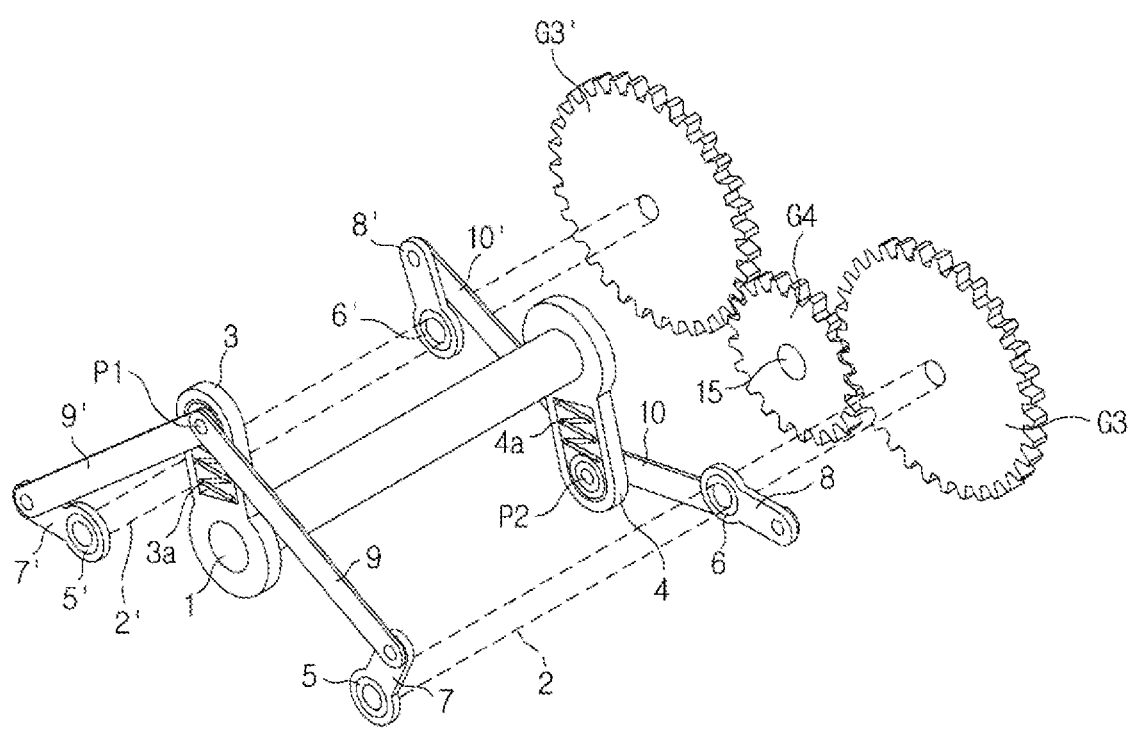
FIG. 1 is a conceptual view illustrating a conventional continuously variable transmission using a lever crank mechanism.
Figure 2:
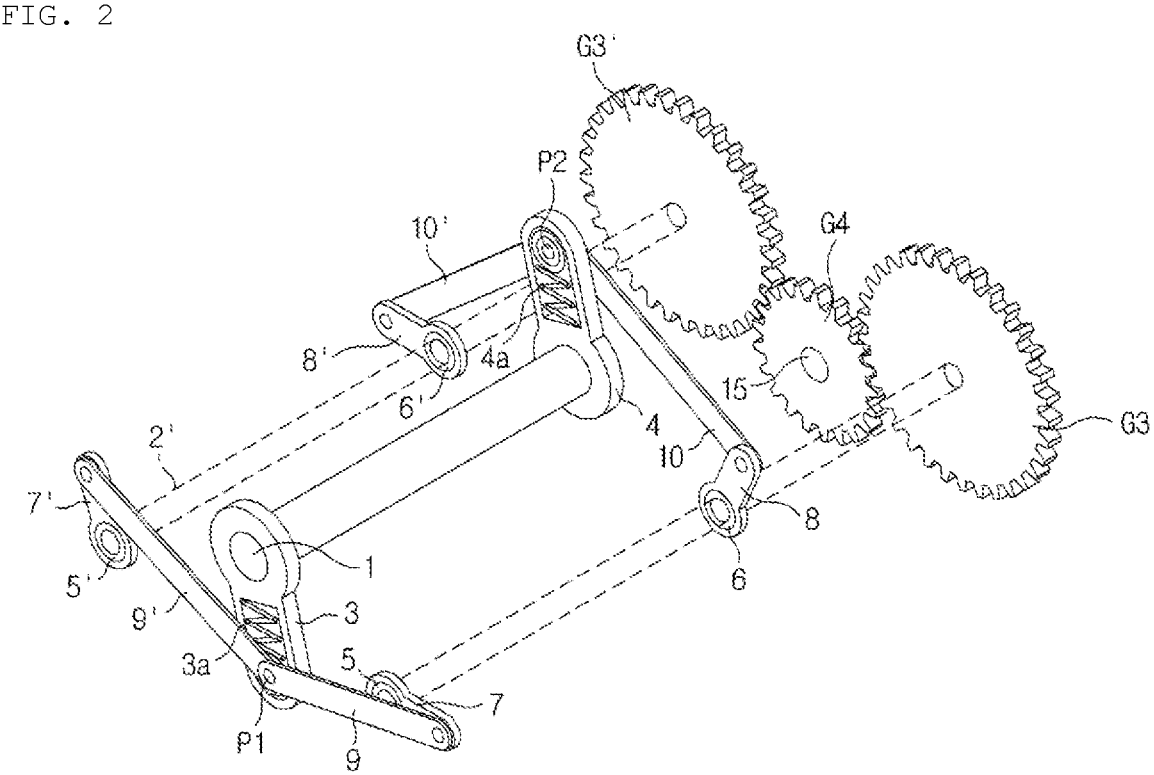
FIG. 2 is a conceptual diagram illustrating the continuously variable transmission with the input link of FIG. 1 moved by 180 degrees.
Figure 6:
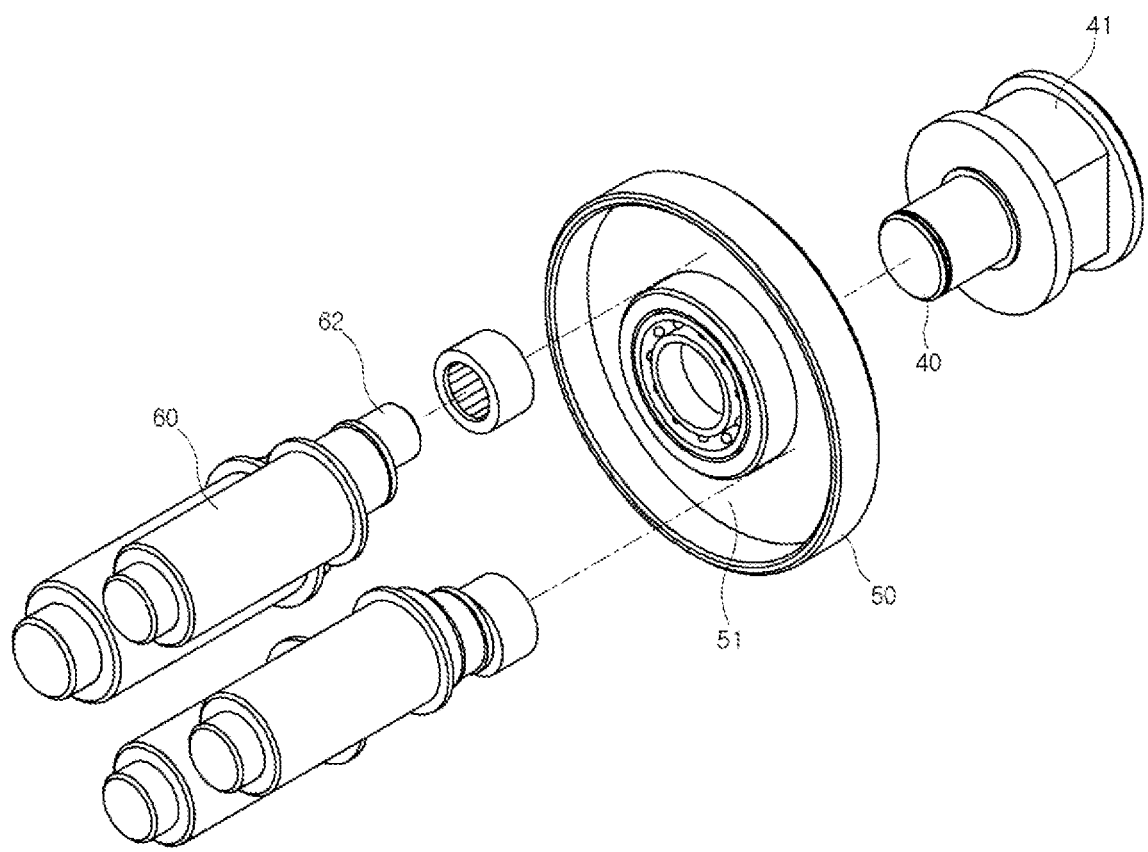
FIG. 6 is an exploded perspective view illustrating engagement between the eccentric shaft of the pivot shaft, the coupler disk, and the variable pin in FIG. 3.
Figure 7:
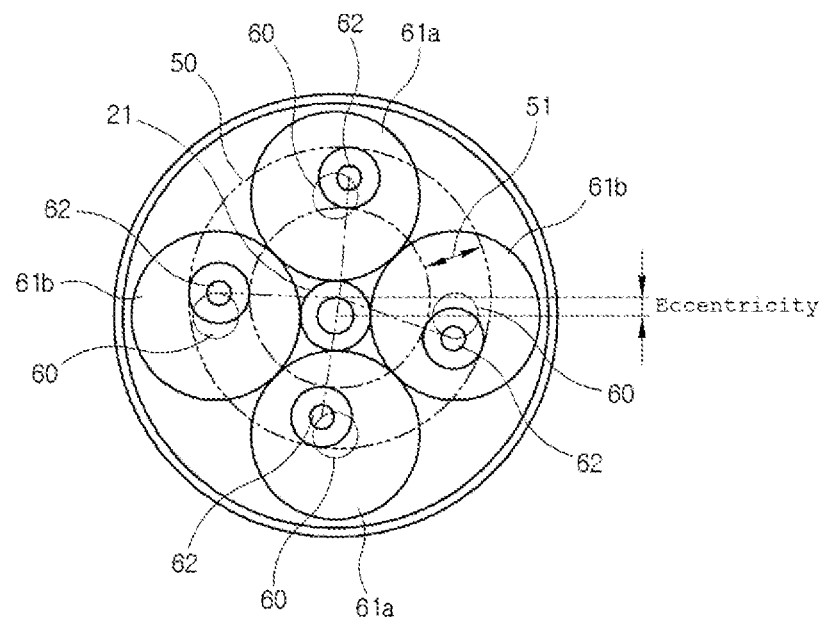
FIG. 7 is a conceptual view illustrating arrangement of the eccentric shaft when the variable pin is positioned on the rotational axis of the output shaft and when the variable pin is located at a position deviated from the rotational axis of the output shaft.
Figure 7:
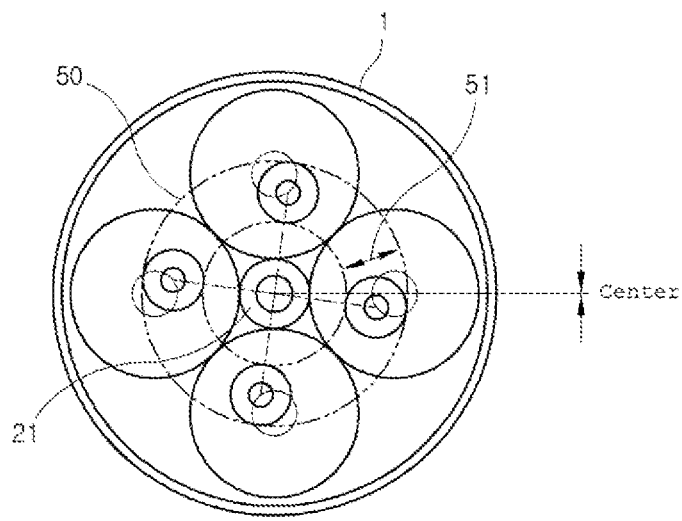

The continuously variable transmission 100 includes a case 1; input shafts 10 disposed parallel to each other and rotatably mounted on the case 1; a housing 30 provided in the case 1 so as to be rotatable about an output shaft 20 and to be rotatably circumscribed about the output shaft 20, and having an input driven gear 31 fixedly circumscribed thereabout and engaged with an input drive gear 11 fixedly circumscribed about the input shafts 11, the housing 30 receiving power from the input shafts 10 and rotating about the output shaft 20 to serve as an input link of a lever crank mechanism; a variable pin 40 positioned at a rotation center of the output shaft 20 on one side of the housing 30 and mounted to be movable in a radial direction of the output shaft 20; a coupler disk 50 circumscribed about the variable pin 40 so as to be movable in a radial direction of the output shaft 20 together with the variable pin 40 to operate as a coupler link disposed in the housing 30, which rotates about the rotation center of the output shaft 20, when the variable pin 40 is biased from the rotation center of the output shaft 20 as shown in FIGS. 1, 6 and 7; at least four even-numbered pivot shafts 60 inscribed in each of at least four even-numbered output gears 61 of a first group and a second group with a clutch interposed therebetween, the at least four pivot shafts 60 being engaged with a final output gear 21 fixedly circumscribed about the output shaft 20 and spaced by the same phase difference from each other around the final output gear 21 (four output gears and four pivot shafts are provided in this embodiment); at least four even-numbered eccentric shafts 62 protruding toward the variable pin 40 from one end of each of the pivot shafts 60 facing the variable pin 40 and integrally coupled to the pivot shafts 60 such that the at least four pivot shafts 60 operate as output links, the at least four eccentric shafts 62 being arranged around the output shaft 20 with the same phase difference therebetween when the variable pin 40 is positioned at the rotation center of the output shaft 20; and a track ring 51 integrally provided to the coupler disk 50 to guide the at least four even-numbered eccentric shafts 62 such that the at least four even-numbered eccentric shafts 62 can pivot about rotation centers of the pivot shafts 60 and revolve around the rotation center of the output shaft 20.

Figure 5:
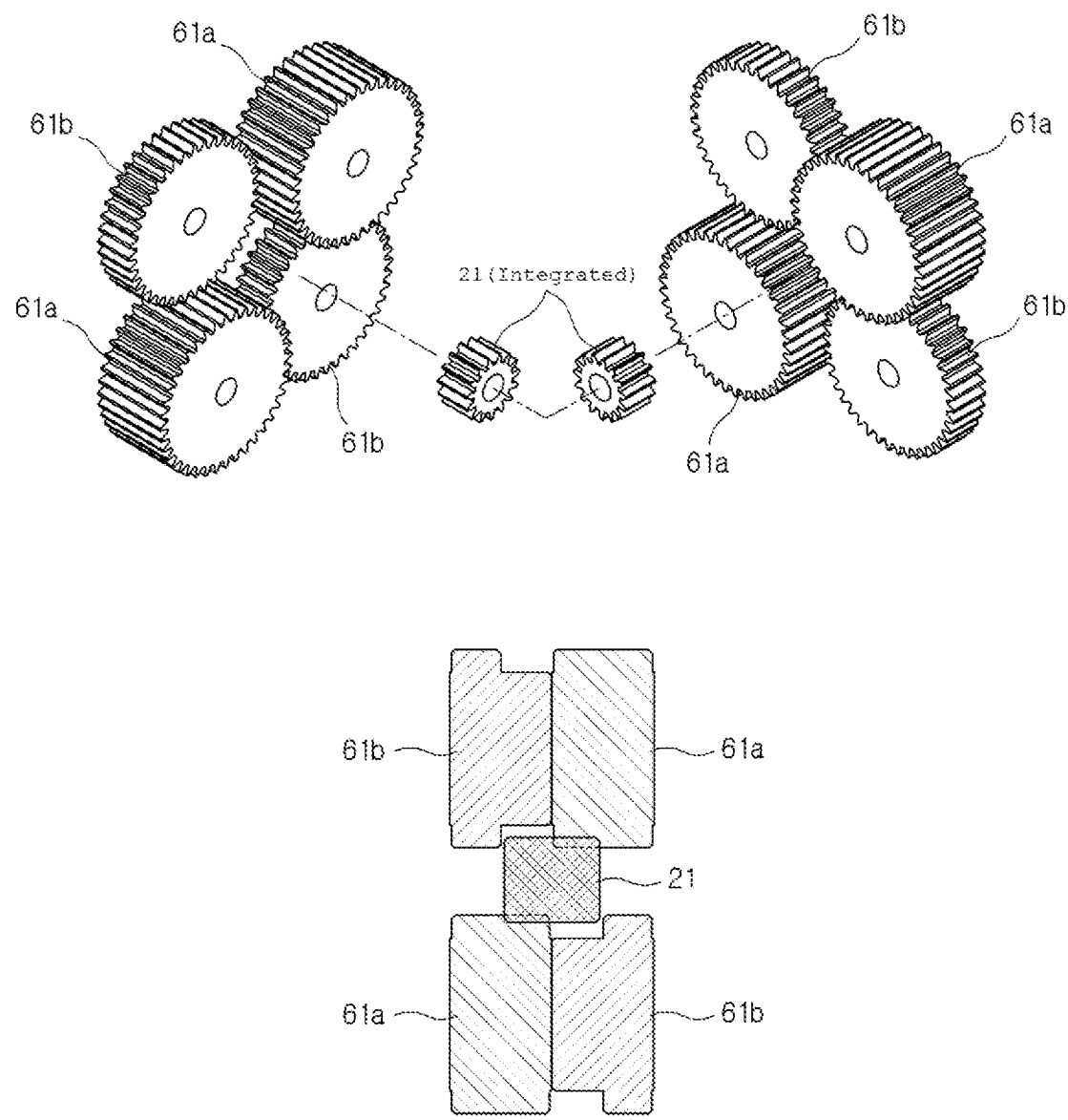
FIG. 5 is a conceptual diagram illustrating coupling between the output gears and the final output gear of FIG. 3.

As shown in FIG. 5, among the at least four even-numbered output gears 61 of the first group and the second group, the at least four even-numbered output gears 61 of the first group include large gears 61a (which are long in the axial direction) and small gears 61b (which are short in the axial direction) alternately arranged with the same phase difference therebetween in a circumferential direction of the output shaft 20 such that the gears adjacent to each other in the circumferential direction of the output shaft 20 are engaged with each other, and the at least four even-numbered output gears 61 of the second group include small gears 61b and large gears 61a alternately arranged with the same phase difference therebetween in a circumferential direction of the output shaft 20 such that the gears adjacent to each other in the circumferential direction of the output shaft 20 are engaged with each other.

That is, FIG. 5 illustrates that a phase difference between the large gears of the first and second groups is 90 degrees and a phase difference between the small gears of the first and second groups is also 90 degrees.

Therefore, on the circumference of the output shaft 20, the large gear 61a located at the 12 o'clock position, the small gear 61b located at the 3 o'clock position, the large gear 61a located at the 6 o'clock position, and the small gear 61b located at the 9 o'clock direction are sequentially arranged in a single layer such that adjacent gears in the circumferential direction, that is, the large gear 61a and the small gear 61b, are engaged with each other. In addition, on the circumference of the output shaft, the small gear 61b located at the 12 o'clock position, the large gear 61a located at the 3 o'clock direction, the small gear 61b located at the 6 o'clock position, and the large gear 61a located at the 9 o'clock position are sequentially arranged in another layer such that adjacent gears in the circumferential direction, that is, the large gear 61a and the small gear 61b are engaged with each other.

Further, the large gears 61a are engaged with the final output gear 21 with a reverse clutch C1 interposed between the large gears 61a and the pivot shafts 60, and the small gears 61b are not engaged with the final output gear 21 with a forward clutch C2 interposed between the small gears 61b and the pivot shafts 60.

The variable pin 40 is coupled to a positioning means for positioning the variable pin 40 so as to be movable between a position of the rotation center of the output shaft 20 and an eccentric position biased from the rotation center in a radial direction of the output shaft 20.

For the positioning means, means disclosed in Korean Patent Nos. 10-1101366 and 10-1389280, which were granted to the inventors of the present invention, and Korean Patent Application No. 10-2016-0006992, which is pending, can be employed.

The continuously variable transmission 100 configured as described above may operate as follows.

When the input shaft 10 rotates in the forward direction, the housing 30 rotates in the reverse direction about the axis of rotation of the output shaft 20 via the input drive gear 11 and the input driven gear 31.

At this time, when the variable pin 40 is positioned at the rotational center of the output shaft 20 by the positioning means, the center of the coupler disk 50 is also positioned at the rotational center of the output shaft 20. Thereby, the eccentric shafts 62 of the at least four even-numbered pivot shafts 60 of the first and second groups revolve around the center of rotation of the output shaft but do not rotate about the pivot centers of the pivot shafts 60. As a result, rotation of the input shaft 10 is not transmitted to the output shaft 20.

When the variable pin 40 is moved to a position deviated from the rotation center of the output shaft 20 by the positioning means and is thus positioned at the eccentric position, the eccentric shafts 62 of the at least four even-numbered pivot shafts 60 of the first and second groups revolve around the rotation center of the output shafts and rotate about the pivot centers of the pivot shafts 60 (wiper movement).

As the eccentric shafts 62 revolve and rotate, the eccentric shafts 62 perform wiper movement about the rotation centers of the pivot shafts 60 within a predetermined angle, and the pivot shaft 60 integrally coupled to the eccentric shafts 60 also pivotably reciprocate forward and backward about the rotation centers of the pivot shafts 60 within a predetermined angle.

In the above embodiment, four pivot shafts 60 are arranged around the output shaft 20 and spaced apart by a phase difference of 90 degrees. Accordingly, when the two pivot shafts 60 having a phase difference between 0 degrees and 180 degrees are rotated in the reverse direction, the other two pivot shafts 60 having a phase difference between 180 degrees and 360 degrees are rotated in the forward direction. Therefore, among the large gear 61a circumscribed about the pivot shafts 60 via the reverse clutch C1 and the small gears 61b circumscribed about the pivot shafts 60 via the forward clutch C2, the large gear 61a at the 12 o'clock position is engaged with the reverse clutch C1 by the reverse rotation of the pivot shaft 60 and rotated in the reverse direction together with the pivot shaft 60. Thereby, the large gear 61a receives power of the input side from the pivot shaft 60 and transmits the same to the final output gear 21. The small gear 61b at the 3 o'clock position is not engaged with forward clutch C2 by the reverse rotation of the pivot shaft 60. Accordingly, the small gear 61b is engaged with the large gear 61a rotating in the reverse direction and idles in the forward direction. The large gear 61a at the 6 o'clock position idles without being engaged with the reverse clutch C1 due to the forward rotation of the pivot shaft 60, and the small gear 61b at the 9 o'clock position is engaged with the forward clutch C2 by the forward rotation of the pivot shaft 60 and thus rotated in the forward direction to forcibly rotate the large gear 61a which is at the 6 o'clock position in the reverse direction, thereby receiving power of the input side from the pivot shaft 60 and transmitting the same to the final output gear 21. As a result, the two large gears 61a always transmit power to the final output gears 21.

Therefore, since the large gears 61a of the first group have a phase difference of 90 degrees from the large gears 61a of the second group, the two pivot shafts 60 inscribed in the two large gears 61a of the first group are paused when the pivot shafts 60 are switched from the forward direction to the reverse direction or from the reverse direction to the forward direction. However, since the large gears 61a of the second group disposed with a phase difference of 90 degrees from the large gears 61a of the first group are in the power transmission state, the final output gear 21 always receives power by the large gears of the first and second groups without interruption of power transmission.

In this state, as the variable pin 40 moves away from the rotation center of the output shaft 20, the rotation angle of the wiper movement of the pivot shafts 60 is increased, increasing the speed of the output shaft 20. As the variable pin 40 approaches the rotation center of the output shaft 20, the rotation angle of the wiper movement of the pivot shafts 60 is reduced, decreasing the speed of the output shaft 20. When the variable pin 40 is positioned at the rotation center of the output shaft 20, the eccentric shaft 62 can revolve but cannot rotate. Thereby, the four pivot shafts 60 cannot perform the wiper movement and therefore cannot transmit the power of the input side to the output shaft 20.

Since the large gears and the small gears of the first group are engaged with each other, and the large gears and the small gears of the second group are engaged with each other, the two large gears 61a can distribute the load transmitted from the input side or the output side to the two small gears 61b engaged with the large gears 61a.

Therefore, the continuously variable transmission can withstand a larger load than in conventional cases. Furthermore, the continuously variable transmission can transmit power to the output shaft without interruption of power transmission and perform the continuously variable transmission operation while being easily balanced.

When the continuously variable transmission device 100 is applied to an automobile in which the output shaft can rotate faster than the input shaft due to inertia on an inclined downhill road, the continuously variable transmission 100 may further include an engine brake means 70 to prevent the output shaft from rotating faster than the input shaft.

As shown in FIG. 3, the engine brake unit 70 includes a ring-shaped internal gear 71 provided at one side of the housing 30 rotated about the rotation center of the output shaft 20 by the input shaft 10 such that the ring-shaped internal gear 71 rotates about the rotation center of the output shaft 20 together with the housing 30; a fixed shaft 72 having a base end fixedly mounted on one side of the case 1, and a leading end extending in parallel with the output shaft 20 in the opposite direction of the case 1; an idle gear 73 rotatably circumscribed about the fixed shaft 72 and engaged with the internal gear 71; and braking gear 74 circumscribed about the output shaft 20 with a forward clutch C3 interposed therebetween, the braking gear 74 being engaged with the idle gear 73.

When the output shaft 20 is not rotated faster than the housing 30 in the forward direction, the forward clutch C3 allows the braking gear 74 to idle. When the output shaft is rotated faster than the housing 30 in the forward direction, the forward clutch C3 is engaged with the braking gear 74 and, accordingly, rotation of the output shaft 20 is restricted by the housing 30 while the output shaft 20 is rotated at the same rotational speed as that of the housing 30.

In the case where the engine brake means 70 is applied, the forward clutch C4 described below is omitted.

The continuously variable transmission device 100 further includes a forward clutch C4 interposed between the input shaft 10 and the input drive gear 11 in preparation for a case where the output shaft 20 is to be rotated in the reverse direction without rotating the input shaft 10. The forward clutch C4 is engaged in a forward direction in which the input shaft 10 rotates such that, when power is transmitted from the input side to the input shaft 10, the forward clutch C4 is engaged with the input driven gear 31 to rotate the housing 30 in the reverse direction. For example, when power is not transmitted from the input side to the input shaft 10 as in the case where the engine or the motor stops, if the output shaft 20 is rotated in the reverse direction to reverse a vehicle or a bicycle, the reverse clutch C1 interposed between the large gear 61a and the pivot shaft 60 is engaged to rotate the housing 30 in the reverse direction. Thereby, the forward clutch C4 is set in the non-engagement state, and thus the output shaft 20 is freely rotatable in the reverse direction.

In addition to means disclosed as the positioning means in Korean Patent Nos. 10-1101366 and 10-1389280, which were granted to the inventors of the present invention, and Korean Patent Application No. 10-2016-0006992, which is pending, the continuously variable transmission 100 eliminates the need for the conventional mechanical and electrical variation techniques which are operatively connected with an accelerator pedal of an automobile or an acceleration throttle of a motorcycle and requires electric/electronic control. Therefore, the following positioning means may be provided to reduce production cost and minimize occurrence of defects.

Figure 4:
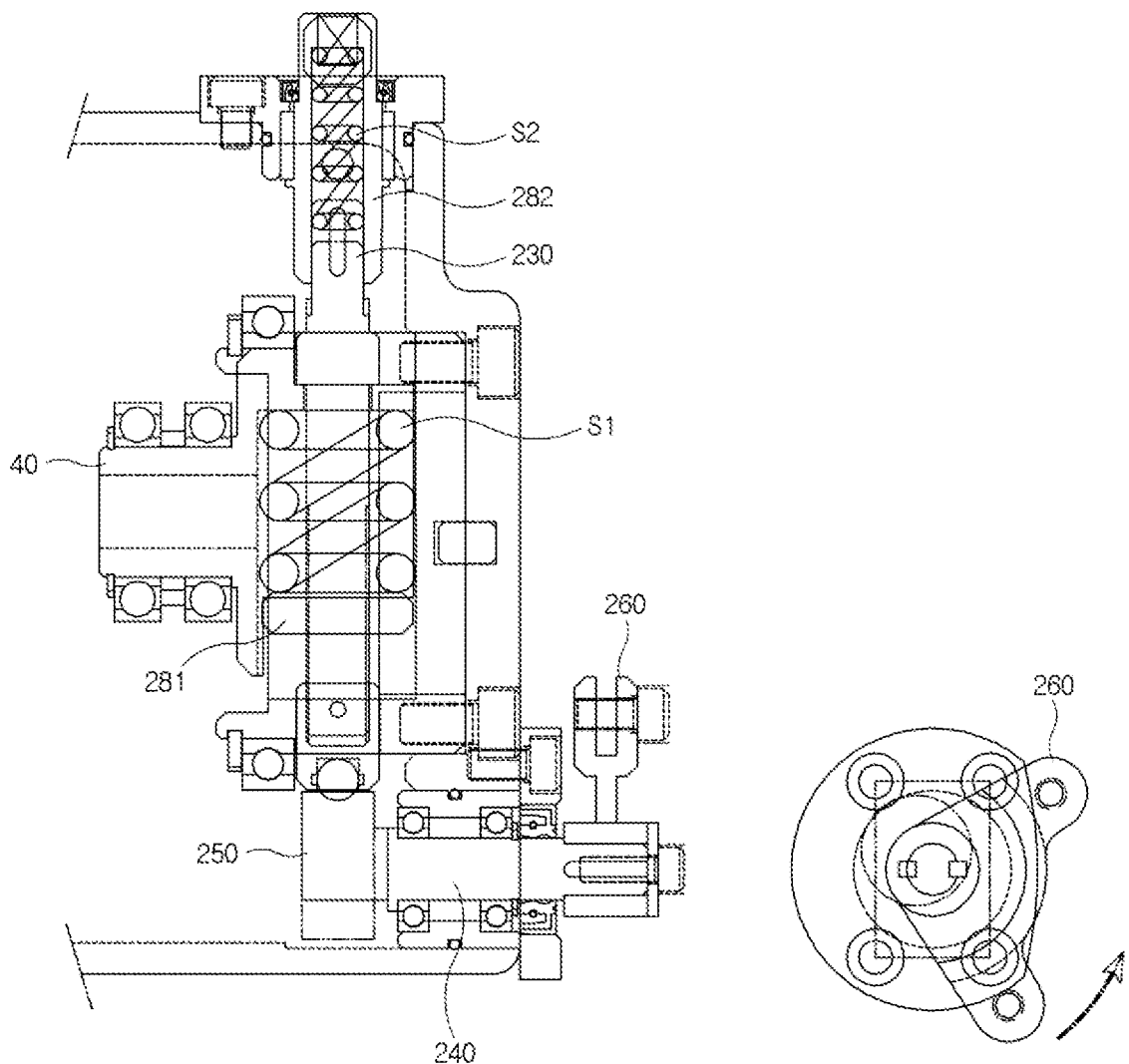
FIG. 4 is a cross-sectional view illustrating a means for shifting the position of the variable pin of FIG. 3.

As shown in FIGS. 3 and 4, the positioning means includes a drum 210 fixedly circumscribed about one end of the input shaft 10 or one end of the output shaft 20 the drum is illustrated in this embodiment as being coupled to the input shaft; a variable pin housing 220 having a base end 41 of the variable pin 40 installed therein in a fitting manner such that the variable pin 40 is movable in a radial direction of the output shaft 20, the variable pin housing 220 being mounted to the case 1; a protruding/retracting rod 230 extending in the radial direction of the output shaft 20 and mounted to the base end 41 of the variable pin so as to be movable in the radial direction of the output shaft 20 together with the base end 41 of the variable pin; a cam shaft 240 extending perpendicularly to a direction of extension of the protruding/retracting rod 230 and rotatably mounted on the case 1; a cam 250 fixedly circumscribed about a leading end of the cam shaft 240 and contacting an end of the protruding/retracting rod 230 to selectively move the protruding/retracting rod 230 in one of radially opposite directions of the output shaft 20 as the cam shaft 240 makes pivotal movement in forward and reverse directions; a pivot lever 260 fixedly circumscribed about a base end of the cam shaft 240; and a string 270 having one end fixed to the lever 260 and the other end wound on the drum 210 a plurality of times and fixed to a shift lever, not shown, such as an accelerator pedal or an acceleration throttle.

A first spring S1 and a second spring S2 are disposed at both ends of the protruding/retracting rod 230 with the base end 41 of the variable pin 40 interposed therebetween.

A first pressing piece 281 contacting the other end of the first spring S1 is fixedly circumscribed about one end of the protruding/retracting rod 230 proximal to the cam 250, the first pressing piece 281 having one end contacting one side of the base end 41 of the variable pin 40 while being circumscribed about the protruding/retracting rod 230.

The other end of the protruding/retracting rod 230 facing away from the cam 250 is provided with a second pressing piece 282 contacting an opposite end of the second spring S2 having one end contacting the other side of the base end 41 of the variable pin 40 and inscribed in the second spring S2, the second pressing piece 282 being mounted on the case 1.

For the positioning means configured as above, when the shift lever is moved to pull the string 270, the string 270 is tensioned on the drum 210, and pulled by the rotational force of the input shaft 10. Then, the pivot lever 260 is turned in one direction to turn the cam shaft 240 in one direction. As the cam shaft 240 is turned, the protruding/retracting rod 230, which is in contact with the cam 250, is moved radially outward while pressing the first and second springs S1 and S2. When the shift lever is moved to release the string 270, the string 270 becomes loose on the drum 210, and thus pulling of the string with respect to the pivot lever 260 is released while the drum 210 idles with respect to the pivot 270. Thereby, the restoring force of the first and second springs S1 and S2 drives the projecting/retracting rod 230 to press the cam 250 to turn the cam shaft 240 in the opposite direction. Then, the pivot lever 260 is turned in the opposite direction, and the projecting/retracting rod 230 is moved radially inward to perform deceleration.

When the shift lever is moved to decrease or increase the speed and then stopped, the portion of the string 270 between the shift lever and the drum 210 becomes loose, and the portion of the string 270 between the drum 210 and the pivot lever 260 is tensioned. Thereby, the variable pin 40 can no longer move to a position for decreasing or increasing the speed.

Figure 9:
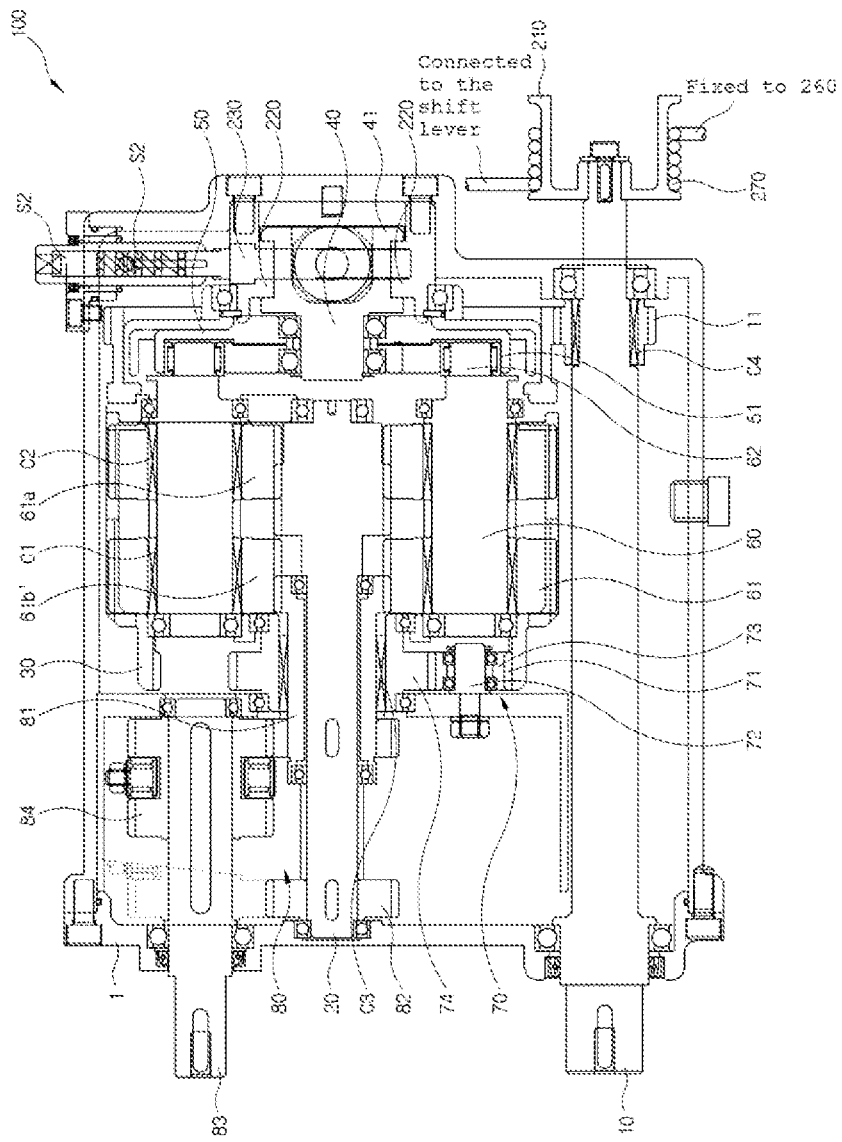
FIG. 9 is a cross-sectional view illustrating a continuously variable transmission provided with a forward/reverse switching means when a large gear adjacent to the variable pin is at 12 o'clock, according to an additional embodiment.
Figure 10:
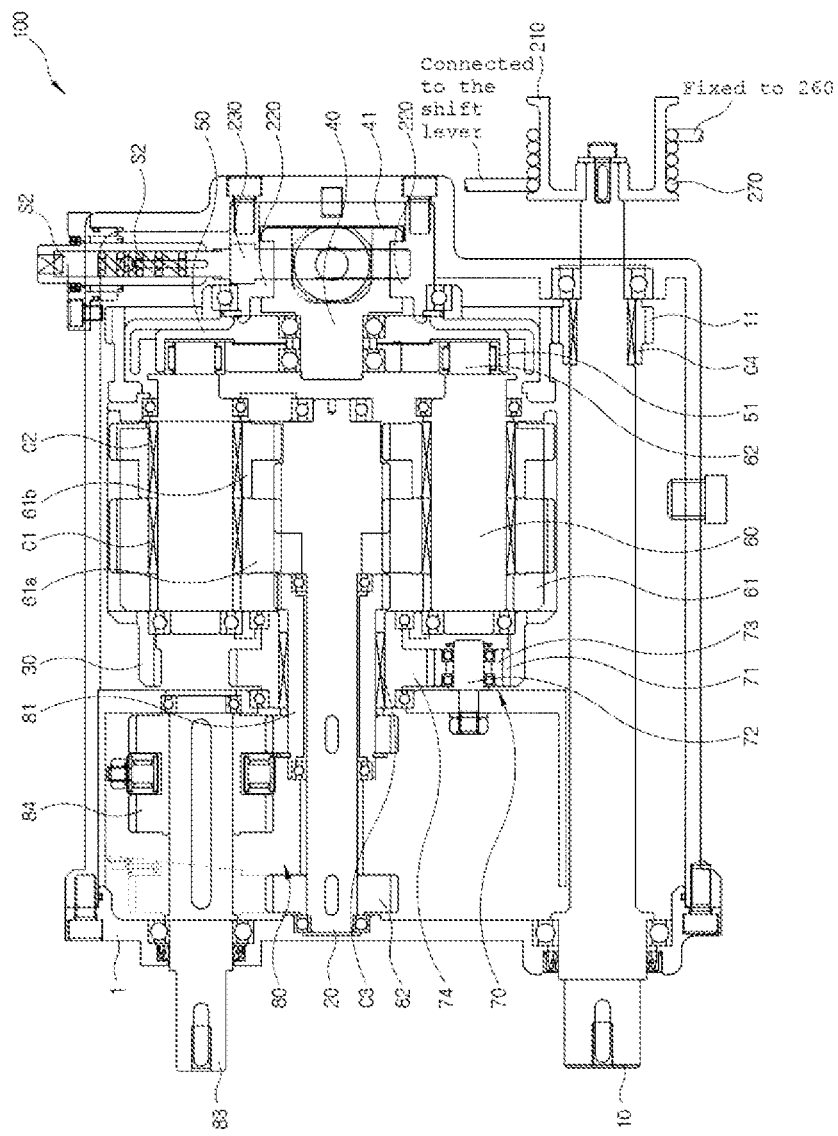
FIG. 10 is a cross-sectional view illustrating a continuously variable transmission provided with a forward/reverse switching means when a small gear adjacent to the variable pin is at the 12 o'clock position, according to an additional embodiment.

While the continuously variable transmission 100 is illustrated in the above embodiment as rotating the output shaft 20 in the forward direction, the present invention is not limited thereto. As an additional embodiment, to rotate the output shaft 20 in the reverse direction, the forward/reverse switching means 80 as shown in FIGS. 9 and 10 may be further provided.

Figure 8:
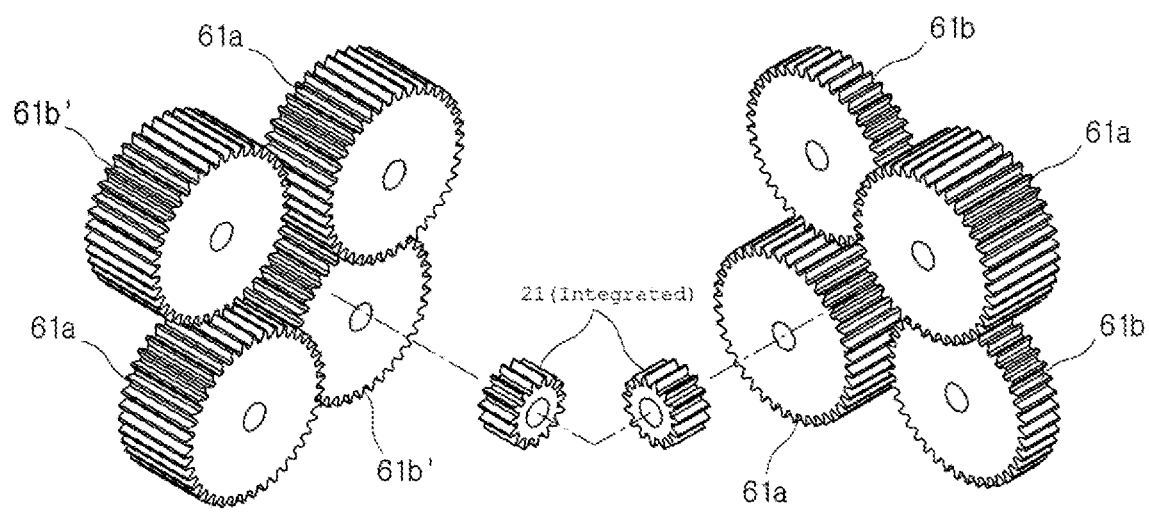
FIG. 8 is a view illustrating an extension gear formed by extending, to one side, the small gears disposed on one side among the output gears of FIG. 5, according to an additional embodiment.

As in the previous embodiment, among at least four even-numbered output gears 61 of the first group and the second group, at least four even-numbered output gears 61 of the first group include large gears 61a (which are long in the axial direction) and small gears 61b (which are short in the axial direction) alternately arranged with the same phase difference in a circumferential direction of the output shaft 20 such that the gears adjacent to each other in the circumferential direction of the output shaft 20 are engaged with each other, and the at least four even-numbered output gears 61 of the second group include small gears 61b and large gears 61a alternately arranged with the same phase difference in a circumferential direction of the output shaft 20 such that the gears adjacent to each other in the circumferential direction of the output shaft 20 are engaged with each other, as shown in FIGS. 1 and 5. Here, the forward/reverse switching means 80 includes a reverse rotation gear 81 rotatably circumscribed about the output shaft 20 such that one end thereof is engaged with an extension gear 61b', as shown in FIGS. 9 and 10, when the extension gear 61b' is formed by further extending the small gears 61b of the second group disposed farther from the variable pin 40 in a direction facing away from the variable pin 40 as shown in FIG. 8; a forward rotation gear 82 spaced from the reverse rotation gear 81 in the direction facing away from the variable pin 40 and fixedly circumscribed about the output shaft 20; a final output shaft 83 extending in parallel with the output shaft 20 and rotatably mounted on the case 1; and a clutch gear 84 key-coupled and circumscribed about the final output shaft 83 so as to be movable in an axial direction of the final output shaft 83 such that the clutch gear 84 is engaged with the reverse rotation gear 81 when moved toward the variable pin 40 and is engaged with the forward rotation gear 82 when moved in the direction facing away from the variable pin 40.

When the clutch gear 84 is engaged with the forward rotation gear 82, the forward/reverse switching means 80 configured as described above rotates the output shaft 20 in the forward direction as in the above embodiment, thereby rotating the final output shaft in the reverse direction. When the clutch gear 84 is engaged with the reverse rotation gear 81, the output shaft 20 is rotated in the forward direction by the first group of output gears 61, but power cannot be transmitted to the final output shaft 83 because the reverse rotation gear 81 is rotatably circumscribed about the output shaft 20. However, since the extension gears 61b' of the second group circumscribed about the pivot shaft 60 with the forward clutch C2 interposed therebetween is engaged with the reverse rotation gear 81, the reverse rotation gear 81 is rotated in the reverse direction to rotate the final output shaft 83 in the reverse direction.

Among the small gears 61b circumscribed about the pivot shafts 60 via the forward clutch C2, the large gear 61a at the 12 o'clock position is engaged with the reverse clutch C1 by the reverse rotation of the pivot shaft 60 and rotated in the reverse direction together with the pivot shaft 60. Thereby, the large gear 61*a* receives power of the input side from the pivot shaft 60 and transmits the same to the final output gear 21. The small gear 61*b* at the 3 o'clock position is not engaged with forward clutch C2 by the reverse rotation of the pivot shaft 60. Accordingly, the small gear 61*b* is engaged with the large gear 61*a* rotating in the reverse direction and idles in the forward direction. The large gear 61*a* at the 6 o'clock position idles without being engaged with the reverse clutch C1 due to the forward rotation of the pivot shaft 60, and the small gear 61*b* at the 9 o'clock position is engaged with the forward clutch C2 by the forward rotation of the pivot shaft 60 and thus rotated in the forward direction to forcibly rotate the large gear 61*a* which is at the 6 o'clock position in the reverse direction, thereby receiving power of the input side from the pivot shaft 60 and transmitting the same to the final output gear 21. As a result, the two large gears 61*a* always transmit power to the final output gears 21.

In this state, as the variable pin 40 moves away from the rotation center of the output shaft 20, the rotation angle of the wiper movement of the pivot shafts 60 is increased, increasing the speed of the output shaft 20 in the reverse direction. As the variable pin 40 approaches the rotation center of the output shaft 20, the rotation angle of the wiper movement of the pivot shafts 60 is reduced, decreasing the speed of the output shaft 20 in the reverse direction. When the variable pin 40 is positioned at the rotation center of the output shaft 20, the eccentric shaft 62 can revolve but cannot rotate. Thereby, the four pivot shafts cannot perform the wiper movement and therefore cannot transmit the power of the input side to the output shaft 20.

The invention claimed is:

1. A continuously variable transmission comprising:
   a housing provided in a case so as to be rotatable about an output shaft and to be rotatably circumscribed about the output shaft, and having an input driven gear fixedly circumscribed thereabout and engaged with an input drive gear fixedly circumscribed about an input shaft, the housing receiving power from the input shaft and rotating about the output shaft to serve as an input link of a lever crank mechanism;
   a variable pin positioned at a rotation center of the output shaft on one side of the housing and mounted to be movable in a radial direction of the output shaft;
   a coupler disk circumscribed about the variable pin so as to be movable in the radial direction of the output shaft together with the variable pin to operate as a coupler link when the variable pin is biased from the rotation center of the output shaft;
   at least four even-numbered pivot shafts inscribed in each of at least four even-numbered output gears of a first group with a clutch interposed therebetween, the at least four pivot shafts being engaged with a final output gear fixedly circumscribed about the output shaft and spaced by the same phase difference from each other around the final output gear;
   at least four even-numbered eccentric shafts protruding toward the variable pin from one end of each of the pivot shafts facing the variable pin and coupled to the pivot shafts such that the at least four pivot shafts operate as output links and the at least four even-numbered eccentric shafts are deviated from rotation centers of the pivot shafts, the at least four eccentric shafts being arranged around the output shaft with a same phase difference when the variable pin is positioned at the rotation center of the output shaft; and
   a track ring integrally provided to the coupler disk to guide the at least four even-numbered eccentric shafts such that the at least four even-numbered eccentric shafts are pivotable about rotation centers of the pivot shafts and revolvable around the rotation center of the output shaft.

2. The continuously variable transmission according to claim 1, wherein:
   the least at four even-numbered output gears of the first group comprises large gears and small gears alternately arranged with the same phase difference in a circumferential direction of the output shaft such that the gears adjacent to each other in the circumferential direction of the output shaft are engaged with each other, and
   the large gears are engaged with the final output gear with a reverse clutch interposed between the large gears and the pivot shafts, and the small gears are not engaged with the final output gear with a forward clutch interposed between the small gears and the pivot shafts.

3. The continuously variable transmission according to claim 2, further comprising:
   at least four even-numbered output gears of a second group spaced apart from the at least four even-numbered output gears of the first group in an axial direction of the at least four pivot shafts and circumscribed about the at least four pivot shafts with a clutch interposed therebetween, wherein:
   the at least four even-numbered output gears of the second group are engaged with the final output gear, and comprises large gears and small gears alternately arranged with the same phase difference in the circumferential direction of the output shaft such that the gears adjacent to each other in the circumferential direction of the output shaft are engaged with each other, and
   the large gears are engaged with the final output gear with the reverse clutch interposed between the large gears and the pivot shafts, and the small gears are not engaged with the final output gear with the forward clutch interposed between the small gears and the pivot shafts.

4. The continuously variable transmission according to claim 3, further comprising:
   a forward/reverse switching means that includes:
   a reverse rotation gear rotatably circumscribed about the output shaft such that one end thereof is engaged with an extension gear when the extension gear is formed by further extending the small gears of the second group disposed farther from the variable pin in a direction facing away from the variable pin;
   a forward rotation gear spaced from the reverse rotation gear in the direction facing away from the variable pin and fixedly circumscribed about the output shaft;
   a final output shaft extending in parallel with the output shaft and rotatably mounted on the case; and
   a clutch gear key-coupled and circumscribed about the final output shaft so as to be movable in an axial direction of the final output shaft such that the clutch gear is engaged with the reverse rotation gear when moved toward the variable pin and is engaged with the forward rotation gear when moved in the direction facing away from the variable pin.

5. The continuously variable transmission according to claim 3, wherein:
   the variable pin is coupled to a positioning means for positioning the variable pin so as to be movable between a position of the rotation center of the output shaft and an eccentric position biased from the rotation center in the radial direction of the output shaft, and the positioning means comprises:
- a drum fixedly circumscribed about one end of the input shaft or the output shaft;
- a variable pin housing having a base end of the variable pin installed therein in a fitting manner such that the variable pin is movable in the radial direction of the output shaft, the variable pin housing being mounted to the case;
- a protruding/retracting rod extending in the radial direction of the output shaft and mounted to the base end of the variable pin so as to be movable in the radial direction of the output shaft together with the base end of the variable pin;
- a cam shaft extending perpendicularly to a direction of extension of the protruding/retracting rod and rotatably mounted on the case;
- a cam fixedly circumscribed about a leading end of the cam shaft and contacting an end of the protruding/retracting rod to selectively move the protruding/retracting rod in one of radially opposite directions of the output shaft as the cam shaft makes pivotal movement in forward and reverse directions;
- a pivot lever fixedly circumscribed about a base end of the cam shaft; and
- a string having one end fixed to the lever and the other end wound on the drum a plurality of times and fixed to a shift lever.

6. The continuously variable transmission according to claim 5, wherein:
- a first spring and a second spring are disposed at both ends of the protruding/retracting rod with the base end of the variable pin interposed therebetween,
- a first pressing piece contacting the other end of the first spring is fixedly circumscribed about one end of the protruding/retracting rod proximal to the cam, the first pressing piece having one end contacting one side of the base end of the variable pin while being circumscribed about the protruding/retracting rod, and
- an other end of the protruding/retracting rod facing away from the cam is provided with a second pressing piece contacting an opposite end of the second spring having one end contacting an other side of the base end of the variable pin and inscribed in the second spring, the second pressing piece being mounted on the case.

7. The continuously variable transmission according to claim 2, wherein:
the variable pin is coupled to a positioning means for positioning the variable pin so as to be movable between a position of the rotation center of the output shaft and an eccentric position biased from the rotation center in the radial direction of the output shaft, and the positioning means comprises:
- a drum fixedly circumscribed about one end of the input shaft or the output shaft;
- a variable pin housing having a base end of the variable pin installed therein in a fitting manner such that the variable pin is movable in the radial direction of the output shaft, the variable pin housing being mounted to the case;
- a protruding/retracting rod extending in the radial direction of the output shaft and mounted to the base end of the variable pin so as to be movable in the radial direction of the output shaft together with the base end of the variable pin;
- a cam shaft extending perpendicularly to a direction of extension of the protruding/retracting rod and rotatably mounted on the case;
- a cam fixedly circumscribed about a leading end of the cam shaft and contacting an end of the protruding/retracting rod to selectively move the protruding/retracting rod in one of radially opposite directions of the output shaft as the cam shaft makes pivotal movement in forward and reverse directions;
- a pivot lever fixedly circumscribed about a base end of the cam shaft; and
- a string having one end fixed to the lever and the other end wound on the drum a plurality of times and fixed to a shift lever.

8. The continuously variable transmission according to claim 7, wherein:
- a first spring and a second spring are disposed at both ends of the protruding/retracting rod with the base end of the variable pin interposed therebetween,
- a first pressing piece contacting the other end of the first spring is fixedly circumscribed about one end of the protruding/retracting rod proximal to the cam, the first pressing piece having one end contacting one side of the base end of the variable pin while being circumscribed about the protruding/retracting rod, and
- an other end of the protruding/retracting rod facing away from the cam is provided with a second pressing piece contacting an opposite end of the second spring having one end contacting an other side of the base end of the variable pin and inscribed in the second spring, the second pressing piece being mounted on the case.

9. The continuously variable transmission according to claim 1, further comprising:
an engine brake means that includes:
- a ring-shaped internal gear provided at one side of the housing rotated about the rotation center of the output shaft by the input shaft such that the ring-shaped internal gear rotates about the rotation center of the output shaft together with the housing;
- a fixed shaft having a base end fixedly mounted on one side of the case, and a leading end extending in parallel with the output shaft in the opposite direction of the case;
- an idle gear rotatably circumscribed about the fixed shaft and engaged with the internal gear; and
- a braking gear circumscribed about the output shaft with a forward clutch interposed therebetween, the braking gear being engaged with the idle gear.

10. The continuously variable transmission according to claim 9, wherein:
the variable pin is coupled to a positioning means for positioning the variable pin so as to be movable between a position of the rotation center of the output shaft and an eccentric position biased from the rotation center in the radial direction of the output shaft, and the positioning means comprises:
- a drum fixedly circumscribed about one end of the input shaft or the output shaft;
- a variable pin housing having a base end of the variable pin installed therein in a fitting manner such that the variable pin is movable in the radial direction of the output shaft, the variable pin housing being mounted to the case;
- a protruding/retracting rod extending in the radial direction of the output shaft and mounted to the base end of the variable pin so as to be movable in the radial direction of the output shaft together with the base end of the variable pin;

a cam shaft extending perpendicularly to a direction of extension of the protruding/retracting rod and rotatably mounted on the case;

a cam fixedly circumscribed about a leading end of the cam shaft and contacting an end of the protruding/retracting rod to selectively move the protruding/retracting rod in one of radially opposite directions of the output shaft as the cam shaft makes pivotal movement in forward and reverse directions;

a pivot lever fixedly circumscribed about a base end of the cam shaft; and a string having one end fixed to the lever and the other end wound on the drum a plurality of times and fixed to a shift lever.

11. The continuously variable transmission according to claim 10, wherein:

a first spring and a second spring are disposed at both ends of the protruding/retracting rod with the base end of the variable pin interposed therebetween, a first pressing piece contacting the other end of the first spring is fixedly circumscribed about one end of the protruding/retracting rod proximal to the cam, the first pressing piece having one end contacting one side of the base end of the variable pin while being circumscribed about the protruding/retracting rod, and an other end of the protruding/retracting rod facing away from the cam is provided with a second pressing piece contacting an opposite end of the second spring having one end contacting an other side of the base end of the variable pin and inscribed in the second spring, the second pressing piece being mounted on the case.

12. The continuously variable transmission according to claim 1, wherein a forward clutch is interposed between the input shaft and the input drive gear.

13. The continuously variable transmission according to claim 12, wherein:

the variable pin is coupled to a positioning means for positioning the variable pin so as to be movable between a position of the rotation center of the output shaft and an eccentric position biased from the rotation center in the radial direction of the output shaft, and the positioning means comprises:

a drum fixedly circumscribed about one end of the input shaft or the output shaft;

a variable pin housing having a base end of the variable pin installed therein in a fitting manner such that the variable pin is movable in the radial direction of the output shaft, the variable pin housing being mounted to the case;

a protruding/retracting rod extending in the radial direction of the output shaft and mounted to the base end of the variable pin so as to be movable in the radial direction of the output shaft together with the base end of the variable pin;

a cam shaft extending perpendicularly to a direction of extension of the protruding/retracting rod and rotatably mounted on the case;

a cam fixedly circumscribed about a leading end of the cam shaft and contacting an end of the protruding/retracting rod to selectively move the protruding/retracting rod in one of radially opposite directions of the output shaft as the cam shaft makes pivotal movement in forward and reverse directions;

a pivot lever fixedly circumscribed about a base end of the cam shaft; and a string having one end fixed to the lever and the other end wound on the drum a plurality of times and fixed to a shift lever.

14. The continuously variable transmission according to claim 13, wherein:

a first spring and a second spring are disposed at both ends of the protruding/retracting rod with the base end of the variable pin interposed therebetween, a first pressing piece contacting the other end of the first spring is fixedly circumscribed about one end of the protruding/retracting rod proximal to the cam, the first pressing piece having one end contacting one side of the base end of the variable pin while being circumscribed about the protruding/retracting rod, and an other end of the protruding/retracting rod facing away from the cam is provided with a second pressing piece contacting an opposite end of the second spring having one end contacting an other side of the base end of the variable pin and inscribed in the second spring, the second pressing piece being mounted on the case.

15. The continuously variable transmission according to claim 1, wherein:

the variable pin is coupled to a positioning means for positioning the variable pin so as to be movable between a position of the rotation center of the output shaft and an eccentric position biased from the rotation center in the radial direction of the output shaft, and the positioning means comprises:

a drum fixedly circumscribed about one end of the input shaft or the output shaft;

a variable pin housing having a base end of the variable pin installed therein in a fitting manner such that the variable pin is movable in the radial direction of the output shaft, the variable pin housing being mounted to the case;

a protruding/retracting rod extending in the radial direction of the output shaft and mounted to the base end of the variable pin so as to be movable in the radial direction of the output shaft together with the base end of the variable pin;

a cam shaft extending perpendicularly to a direction of extension of the protruding/retracting rod and rotatably mounted on the case;

a cam fixedly circumscribed about a leading end of the cam shaft and contacting an end of the protruding/retracting rod to selectively move the protruding/retracting rod in one of radially opposite directions of the output shaft as the cam shaft makes pivotal movement in forward and reverse directions;

a pivot lever fixedly circumscribed about a base end of the cam shaft; and a string having one end fixed to the lever and the other end wound on the drum a plurality of times and fixed to a shift lever.

16. The continuously variable transmission according to claim 15, wherein:

a first spring and a second spring are disposed at both ends of the protruding/retracting rod with the base end of the variable pin interposed therebetween, a first pressing piece contacting the other end of the first spring is fixedly circumscribed about one end of the protruding/retracting rod proximal to the cam, the first pressing piece having one end contacting one side of the base end of the variable pin while being circumscribed about the protruding/retracting rod, and an other end of the protruding/retracting rod facing away from the cam is provided with a second pressing piece contacting an opposite end of the second spring having one end contacting an other side of the base end of the variable pin and inscribed in the second spring, the second pressing piece being mounted on the case.

* * * * *